United States Patent
Betts et al.

(10) Patent No.: US 7,248,681 B2
(45) Date of Patent: *Jul. 24, 2007

(54) SYSTEM AND METHOD FOR REAL-TIME FRAUD DETECTION WITHIN A TELECOMMUNICATION NETWORK

(75) Inventors: Judy Lynn Betts, Plain City, OH (US); Michael Joseph Hatlak, Roselle, IL (US); Michael Joseph McGuire, Stickney, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/443,646

(22) Filed: May 31, 2006

(65) Prior Publication Data

US 2006/0233337 A1    Oct. 19, 2006

Related U.S. Application Data

(63) Continuation of application No. 10/401,099, filed on Mar. 26, 2003, now Pat. No. 7,058,166, which is a continuation of application No. 09/948,148, filed on Sep. 6, 2001, now Pat. No. 6,567,511, which is a continuation of application No. 08/807,039, filed on Feb. 24, 1997, now Pat. No. 6,327,352.

(51) Int. Cl.
*H04M 3/00* (2006.01)
*H04M 15/00* (2006.01)

(52) U.S. Cl. .................. 379/192; 379/114.14; 379/196

(58) Field of Classification Search ................ 379/188, 379/189, 192, 196, 207.04, 111, 112.01, 114.01, 379/115.01
See application file for complete search history.

(56) References Cited

U.S. PATENT DOCUMENTS

| | | | |
|---|---|---|---|
| 4,002,848 A | 1/1977 | Stein | |
| 4,159,400 A | 6/1979 | Hall et al. | |
| 4,188,508 A | 2/1980 | Rogers et al. | |
| 4,799,255 A | 1/1989 | Billinger et al. | |
| 4,811,378 A | 3/1989 | Else et al. | |
| 5,345,595 A | 9/1994 | Johnson et al. | |
| 5,351,290 A * | 9/1994 | Naeini et al. | 379/142.11 |

(Continued)

*Primary Examiner*—Benny Q Tieu
(74) *Attorney, Agent, or Firm*—Brinks Hofer Gilson & Lione

(57) ABSTRACT

Real time detection of the fraudulent use of a telecommunications network is accomplished by analyzing data for each call that is occurring within the network. A signal protocol receiver is used to collect signaling protocol for each call that is occurring within the network. The Signaling protocol data is collected, decoded and formatted into call information records (CIRs). The CIRs contain various operator specified parameters for each call that is occurring within the network. The CIRs are compared to operator defined thresholds. If any of the CIRs exceeds the thresholds, an alert is generated. The alerts are stored in a database where the operator can analyze them and take the appropriate corresponding action to resolve the alert. The alerts and the CIRs are archived in a database so that trends of fraudulent use can be detected and prevented. This method of fraud detection provides for the effective analyzation of every call that is occurring within the network. Accordingly, no call goes unanalyzed and ideally no fraud goes undetected. Additionally, the method does not impose an additional load on the network switching equipment and therefore results in a better quality of transmissions.

19 Claims, 3 Drawing Sheets

U.S. PATENT DOCUMENTS

| | | | |
|---|---|---|---|
| 5,438,570 A * | 8/1995 | Karras et al. ............... 370/426 |
| 5,463,681 A | 10/1995 | Vaios et al. |
| 5,465,387 A | 11/1995 | Mukherjee |
| 5,495,521 A | 2/1996 | Rangachar |
| 5,504,810 A | 4/1996 | McNair |
| 5,506,893 A | 4/1996 | Buscher et al. |
| 5,555,551 A | 9/1996 | Rudokas et al. |
| 5,592,530 A | 1/1997 | Brockman et al. |
| 5,596,632 A | 1/1997 | Curtis et al. |
| 5,602,906 A | 2/1997 | Phelps |
| 5,627,886 A | 5/1997 | Bowman |
| 5,706,338 A * | 1/1998 | Relyea et al. ............... 379/189 |
| 5,729,597 A | 3/1998 | Bhusri |
| 5,768,354 A | 6/1998 | Lange et al. |
| 5,805,686 A | 9/1998 | Moller et al. |
| 5,912,954 A * | 6/1999 | Whited et al. ......... 379/114.29 |
| 5,937,043 A | 8/1999 | He |
| 6,085,084 A * | 7/2000 | Christmas .................. 455/411 |
| 6,185,415 B1 | 2/2001 | Boatwright |
| 6,327,352 B1 | 12/2001 | Betts et al. |
| 6,567,511 B2 | 5/2003 | Betts et al. |
| 7,058,162 B2 | 6/2006 | Gadin |

* cited by examiner 26 (CIR)

ORIGINATING: _____
TERMINATING: _____
BILLING TYPE: _____

*Fig. 3*

SYSTEM AND METHOD FOR REAL-TIME FRAUD DETECTION WITHIN A TELECOMMUNICATION NETWORK

RELATED APPLICATIONS

The present application is a continuation of U.S. application Ser. No. 10/401,099, filed Mar. 26, 2003 now U.S. Pat. No. 7,058,166, which is a continuation of application Ser. No. 09/948,148, filed Sep. 6, 2001, now U.S. Pat. No. 6,567,511, which is a continuation of application Ser. No. 08/807,039, filed Feb. 24, 1997, now U.S. Pat. No. 6,327,352. All of the foregoing applications are hereby incorporated by reference.

BACKGROUND

1. Technical Field

This invention relates generally to detecting fraudulent use of a resource such as a telecommunications network and particularly to methods and systems for detecting and analyzing fraudulent use of a telecommunications network in real-time.

2. Background Information

Modern telecommunications networks consist of a number of interconnected switches which may be provided by a common operating company. Individuals may gain unauthorized access to the network to use the network resources without paying services charges to the operator. Such unauthorized use often results in the wrong party being charged for the use because the fraudulent user is unknown. When the wrong party is charged for the unauthorized use, the telecommunication network's operator will be unable to collect the charges. Such unauthorized use may account for a significant portion of a network operating expenses and impose a financial burden on the operating company.

Fraudulent use of a telecommunications network also consumes valuable network resources which may degrade the quality of service provided to legitimate customers. The misuse of network resources denies legitimate customers access to the network.

An effective way of preventing fraudulent use of a network is to detect the misuse as it occurs. If the misuse is detected as it is occurring, it may then be prevented before or as it occurs. The ability to detect fraudulent use in real-time can thus significantly reduce the financial burden imposed on a network operator. Accordingly, a network which accurately detects fraudulent use of a telecommunications network, in real-time, is needed.

Prior systems have attempted real-time fraud detection. One example of such a system is disclosed in U.S. Pat. No. 5,495,521 to Rangachar, which describes a method and means for preventing fraudulent use of a telephone network. The system described therein utilizes the switching equipment located within a network's central offices to collect data and create a call detail record. The call detail record information is automatically generated by the switching equipment to provide data that is analyzed to detect fraudulent network use.

One problem with this data collection technique is that the switching equipment's primary function is to switch traffic within the system. The creation of call detail records, however, is a secondary function of the switching system. Accordingly, the switching equipment is not a efficient mechanism for generating call detail records. Also, the switching equipment is equipped with hardware and extensive software which facilitate the switching of calls. The software may include upgrades and patches which can interfere with the switching and cause the switch to malfunction. This combination of shortcomings results in a data collection method where a call detail record may not be created for all calls. Accordingly, some fraudulent calls may go undetected.

Another problem with prior data collection methods is that the call records are dependent upon the individual switches. Typically, the call record format is determined by the particular switch handling the call. A network may contain a number of different types of switches. Each switch is programmed to create a call detail record which includes predetermined parameters. Thus, the modification of call detail records generated at the switch level requires the modification of all switches within the telecommunications network that is being monitored for fraud.

The present invention provides a system for detecting fraudulent access to a telecommunications network which effectively analyzes all the calls that are occurring within a network.

The present invention also provides a system for detecting fraudulent access to a telecommunications network which does not place an additional load on the switching equipment within the network.

Finally, the present invention provides a system for detecting fraudulent access to a telecommunications network which is modifiable or customizable independent of the switching equipment within the network.

These and other features and advantages of the invention will be apparent upon consideration of the following detailed description of the preferred embodiments of the invention, taken in conjunction with the appended drawings.

BRIEF DESCRIPTION OF THE DRAWINGS

FIG. 3 is a graphic representation of a call information record.

DETAILED DESCRIPTION OF THE DRAWINGS AND THE PRESENTLY PREFERRED EMBODIMENTS

The preferred embodiment of the present invention enables a telecommunications network operator to detect fraudulent use of a telecommunications network in real-time. The fraud detection is accomplished by effectively analyzing data associated with each call placed through the telecommunications network. The preferred embodiment of the invention enables the operator to analyze a customizable set of call information records in order to detect fraudulent calls. The preferred embodiment also allows for the detection of fraud in a manner which does not load the switching equipment within a network, thereby, resulting in a better quality of service within the network.

Figure 1:
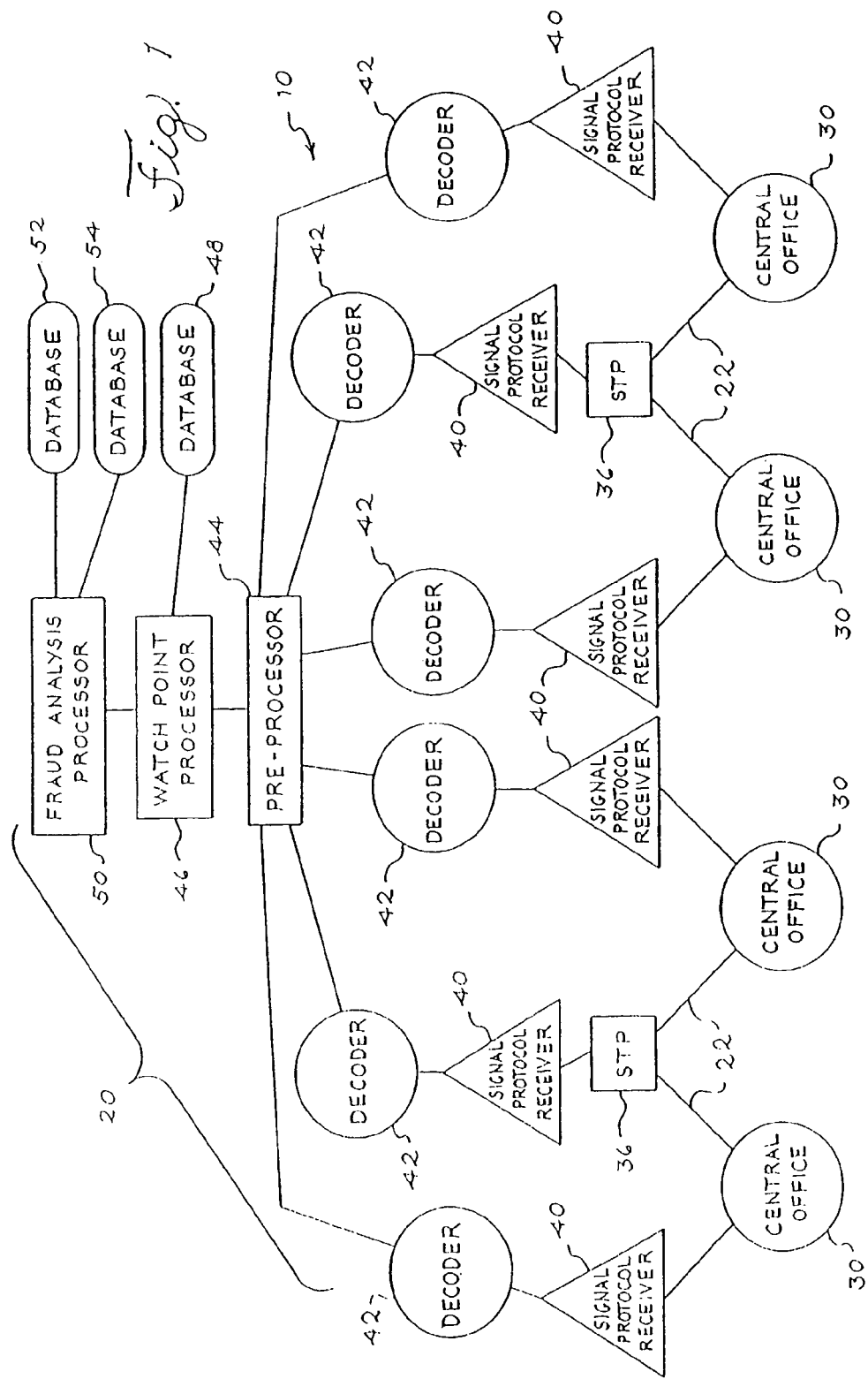
FIG. 1 is a schematic view of a real-time fraud detection system for use in a modern telecommunications network.

Referring now to FIGS. 1 and 3, the preferred embodiment of the invention incorporates a real-time fraud detection system 20 into a modern telecommunications network 10. Modern telecommunications networks typically utilize a signaling protocol 22 to control the switching of voice and data traffic within the network 10. Many different types of existing signaling protocols may be utilized. These signaling protocols may take two common forms, in-band signaling and out-of-band signaling. In-band signaling protocols are interspersed with the voice and data transmissions that are carried over the network. In-band signaling protocols are transmitted with voice and data transmissions between common elements within the network 10. Thus, the in-band signaling protocols are transmitted between the same switches which carry the voice and data communications over the network 10. For example, one such type of in-band signaling protocol is Multiple Frequency R1 (MFR1).

In comparison to in-band signaling, out-of-band signaling protocols are segregated from the corresponding voice and data transmissions. Out-of-band signaling protocols are transmitted along different transmission channels than those that carry voice and data transmissions. Typically, out-of-band signaling protocols are transmitted between the central offices 30 and signal transfer points (STPs) 36. For example, Signaling System 7 (SS7) is one such type of out-of-band signaling protocol.

The present embodiment includes a signal protocol receiver 40 for collecting signaling protocols 22 transmitted within the telecommunications network 10. The collection of network signaling protocol transmissions is well known to those skilled in the art. The signal protocol receiver 40 is separate from the switching equipment within the central offices 30 and the STPs 36 in the network 10. The signal protocol receiver 40 collects the signaling protocol transmissions 22 and does not handle call switching. The signal protocol receiver 40 allows for the non-intrusive monitoring of calls occurring within the network 10.

The present embodiment utilizes the signal protocol receiver 40 to detect fraudulent calls within networks that utilize either in-band signaling protocols or out-of-band signaling protocols. The signal protocol receiver 40 collects signaling protocols 22 associated with each call placed through the network 10. One problem with in-band signaling protocols is that a centralized point of collection does not exist. Thus, to capture in-band signaling protocols, a signal protocol receiver 40 must be located at each switch 32 within the central offices 30 of the network 10. The signal protocol receiver 40 collects the data by sampling the transmitted signaling protocols 22 from the switching equipment 32 in the central offices 30 of the network 10.

Out-of-band signaling protocols have a centralized point of collection as all transmissions are sent through STPs 36. Thus, to capture out-of-band signaling protocols, a signal protocol receiver 40 is located at each STP 36 within the network 10. The signal protocol receiver 40 collects data associated with all of the calls occurring within the network 10. The signal protocol receiver 40 collects the data by sampling the signaling protocol transmissions transmitted via the STPs 36.

With both out-of-band and in-band signaling formats, the signal protocol receiver 40 collects call data directly from the ongoing transmission by using a high impedance bridge tap well known to those skilled in the art. The bridge tap allows for the effective collection of data without affecting the quality of transmissions with the network 10. By utilizing a dedicated signal protocol receiver 40, which is independent from the switching equipment in the central offices 30 and the STPs 36, to collect signaling protocols 22, call data can be effectively collected for every call through the network 10. Accordingly, calls are not missed, and each fraudulent call can be detected. Also, the signal protocol receiver 40 does not produce a load on the switches in the central offices 30 or the STPs 36, which handle the switching of signaling protocols and voice and data transmissions. The independent signal protocol receiver 40 removes the burden of creating call records from the switching equipment in the central offices 30 and the STPs 36, allowing better quality transmissions.

After the signaling protocol data 22 is collected, it is decoded into a useable format. A decoder 42 is used to decode the data as it is collected. For example, decoder 42 transforms the signaling protocol transmissions 22 into a call parameter data 24 which can be analyzed. The decoder 42 formats the transmitted signaling protocol transmissions into call information records 26 (CIRs) using standard high level programming data structures. The CIRs 26 can include various parameters associated with an ongoing call. Some commonly used parameters include: originating; terminating; billing type; using duration; aggregate duration; call volume; etc. The selective incorporation of parameters included in the CIRs 26, eliminates unnecessary data, allowing the signaling protocol data 22 to be processed in a more efficient manner. It also enables the operator to adapt the fraud system 20 to changing requirements by adding new parameters to the CIRs 26 as such parameters become key indicators of fraudulent calls.

In a preferred embodiment, the signal protocol receiver 40 collects and decodes the signaling protocol data into a CIR 26. The signal protocol receiver 40 can programmed to create various types of CIRs 26 based upon the operator's preferences. An operator can choose the specific call parameters that are included within a CIR 26. The signal protocol receiver 40 can then be programmed to create CIRs 26 which incorporate the specific combination of parameters chosen by the operator. Thus, the system can be modified by programming the signal protocol receivers 40 within the network 10. Accordingly, the system is modifiable independent from the switching equipment within the central offices 30 and the STPs 36. A common signal protocol receiver/decoder is the call completion analysis system manufactured by Tekno Industries of Bensenville, Ill.

After the signaling protocols 22 have been collected and decoded, the resulting resulting CIRs 26 are analyzed to determine if unauthorized use of the network 10 is occurring. The CIRs 26 are transmitted from the decoder 42 to a pre-processor 44. The pre-processor 44 classifies the CIRs 26 based upon the CIR 26 parameters. The pre-processor 44 classifies the CIRs 26 into three basic categories: originating; terminating; and bill to type. Within each basic category, the pre-processor 44 further classifies the CIRs 26 into sub-categories such as national, cellular, international, pay phone hot numbers, etc. The classification is configurable and modifiable. This configurability allows the operator to change the monitoring and classification process as different techniques for detecting fraud are developed. The pre-processor 44 also has the ability to discard undesirable CIRs 26 and count the number of CIRs 26 that are discarded. For example, one type of an undesirable CIR 26 may be a duplicate record. In a preferred embodiment, the functionality of the pre-processor 44 is implemented with an NT computer operating system platform. The NT operating system platform allows for an inexpensive modular format which allows the system to be easily expanded or modified as new techniques for detecting fraud are developed. Additionally, the preferred embodiment may be implemented with software as known to those of skill in the art. For example, the preferred embodiment may be written in a high level programming language such as Pascal, C or C++.

After the CIRs 26 are classified, they are analyzed to determine whether unauthorized use is occurring. The CIRs 26 are transmitted from the pre-processor 44 to a watch point processor 46. The watch point processor 46 stores CIRs 26 in a random access memory or a data base 48. Once the CIRs 26 are stored, the watch point processor 46 can continuously apply control techniques to the CIRs 26 in the database 48. The control techniques enable the operator to monitor the various parameters of the CIRs 26 in an organized manner. Some call parameters which can be monitored include: duration, aggregate duration, volume, volume/duration, and simultaneous calls. The control techniques allow for a number of thresholds 60 to be applied to the CIRs 26. The control technique compares the operator defined thresholds 60 to selected parameters of the CIRs 26. When any of the thresholds 60 is satisfied or exceeded, an alert 62 is generated. The thresholds 60 can be applied to a singular CIR 26 and/or groups of CIRs 26. The CIRs 26 can also be compared to one another on a singular or a group basis in order to detect fraud. This methodology allows for a very diverse range of threshold analysis in an attempt to detect fraudulent use which occurs in a variety of forms, as the fraudulent use is occurring. One example of CIR data that may indicate fraudulent use is multiple successive calls charged to the same customer. Another such example is calls with long durations charged to a common customer.

Preferably, the watch point processor 46 and its accompanying control technique software utilizes a UNIX operating system based platform. The development of the control technique software is well understood by those skilled in the art. The UNIX-based system allows for the scalability needed to monitor data from a very small number of switches to hundreds of switches simultaneously. Additionally, the preferred embodiment may be implemented with software as known to those of skill in the art. For example, the preferred embodiment may be written in a high level programming language such as Pascal, C or C++.

The alerts 62 generated by the watch point processor 46 are utilized to signal the operator that fraud has been detected. The alerts 62 generated can be in the form of audible, visual, or a remote alert. A audible or visual alert can be generated by the fraud system 20 to alert the operator that fraud has been detected. Additionally, a remote alert 62 can be sent to an operator via a cellular telephone or a pager system. After receiving the alert 62, the operator may analyze the alerts and take the proper action in response. The operator can notify the customer whose resources are being fraudulently used or the operator can suspend the fraudulent use by cutting off the user and denying further access to the network 10. In addition to notifying the operator that fraud is occurring, the alerts 62 can be analyzed to detect patterns of fraud. According to a preferred embodiment, when an alert 62 is generated by the watch point processor 46 it is sent to the fraud analysis processor 50. The fraud analysis processor 50 stores each alert 62 in a random access memory or a database 52.

In addition to storing the alerts 62, the fraud analysis processor 50 receives all the CIRs 26 to create a database 54 every call that occurs within the network 10. The archiving of information enables a telecommunications network operator to analyze the most recent alerts 62 and CIRs 26 to detect patterns or trends of fraud that are occurring. In a preferred embodiment, the CIRs 26 are stored eight days for customer profiling and daily alert generation. The CIR 26 data is stored in daily tables and indexed according to type of call such as international, domestic, high risk areas, toll free, etc. This data is analyzed daily to detect unusual patterns such as increased traffic volume by number of attempts or duration. For example, the fraud analysis processor 50 compares today's traffic for each unique number to the previous days data and the same day last week. Changes in traffic patterns such as short-term or duration increases in traffic volume can be highlighted. This method detects subscribers that have had their services compromised or even subscribers that are new and are running up large call volumes. The fraud analysis processor 50 allows the operator to detect fraudulent calls early so the operator can take a pro-active measures. For example, new high risk customers that have large volumes within the first week of service may be required to supply deposits to continue service. Additionally, the preferred embodiment may be implemented with computer software as known to those of skill in the art. For example, the preferred embodiment may be written in a high level programming language such as Pascal, C or C++.

In the presently preferred embodiment, the steps of establishing thresholds 60 and generating and analyzing alerts 62 can be enhanced by utilizing a graphic user interface (GUI). The graphic user interface includes all the graphical tools needed to setup and display the pre described functions. Each system element may have its own integrated GUI. For example, the signal protocol receiver/decoder 40 has a GUI that allows the operator to define the CIRs easily and efficiently. The pre-processor 44 has a GUI that displays the status of all call parameters as well as the setup and configuration of the pre-processor 44. The watch point processor 46 has a GUI that allows the operator to setup the thresholds easily and efficiently. The fraud analysis processor 50 has a GUI that allows the operator to analyze the alerts 62, take appropriate action to resolve the alerts 62 and commit all activity into a fraud log. Preferably, all the GUI interfaces are integrated onto one platform, a NT computer operating system based work station. Additionally, the preferred embodiment may be implemented with software well known to those of skill in the art. For example, the preferred embodiment may be written in a high level programming language such as Pascal, C or C++. The interface is constructed in such a way that any number of operators can access the CIR 26 data and analyze the alerts 62. The result is an integrated solution for combating fraudulent activity in the telecommunications network 10 in a real-time/in-progress manner.

Figure 2:
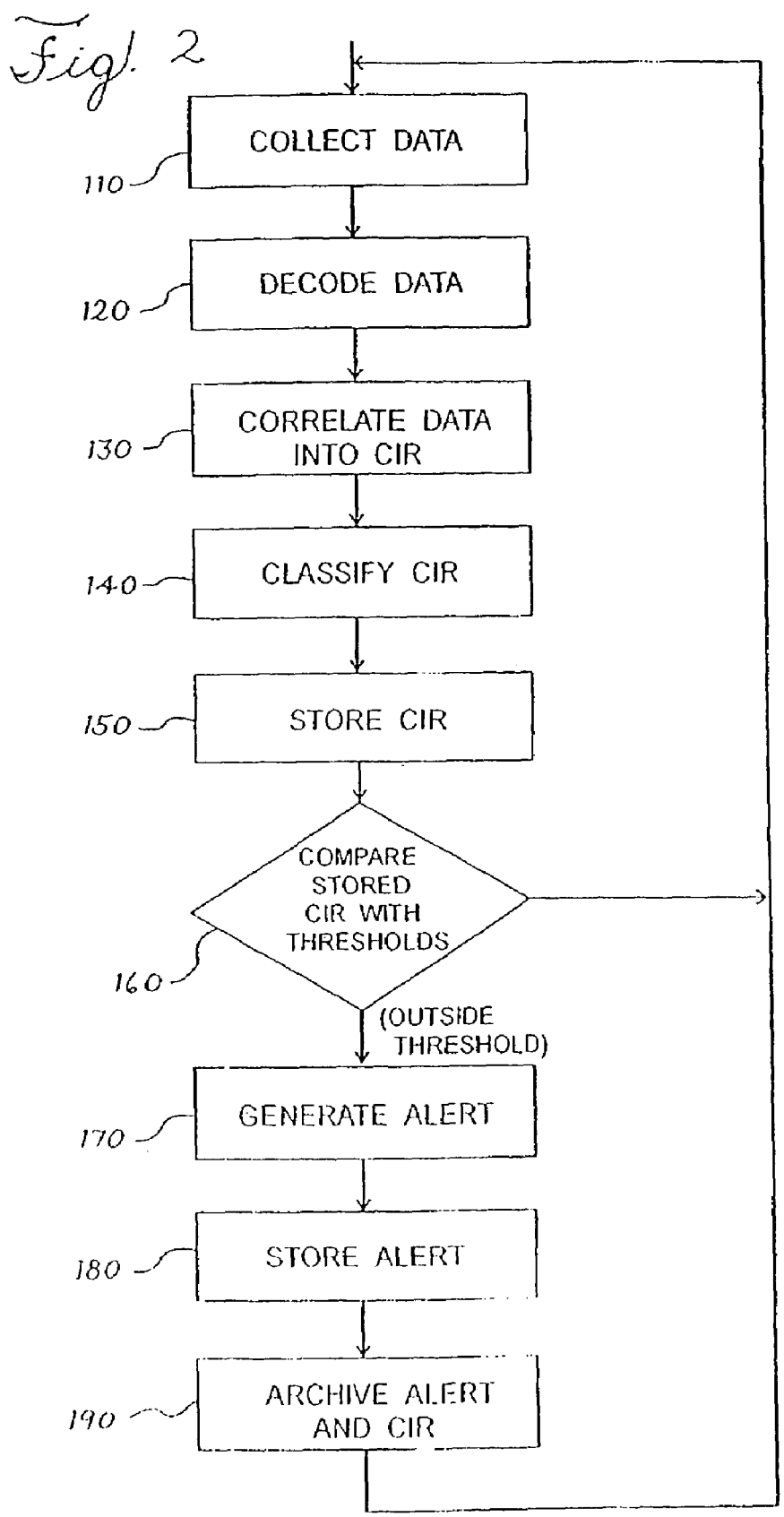
FIG. 2 is a flow chart describing the process of using the system of FIG. 1 to perform real-time fraud detection within a modern telecommunications network.

Referring now to FIG. 2, the system described above is utilized to perform real-time fraud detection. Real-time call data is collected 10 for each call that is occurring through a telecommunications network. The signal protocol receiver (FIG. 1) collects signaling protocol data directly from the transmissions of the data. The signal protocol receiver is capable of collecting both in-band signaling protocol data and out-of-band signaling protocol data, as described in detail above. After the signaling protocol data is collected it is decoded 20 and transformed to a useable format. A decoder (FIG. 1) is used to decode the signaling protocol data. The decoder can decode signaling protocol data that is extracted from a network using either in-band or out-of-band signaling protocols. The decoder transforms the data into a useable form. After the data is decoded, it is correlated 30 into a call information record (CIR). The decoder formats the decoded data into a CIR that contains various call parameters and is created according to predetermined operator preferences.

After the CIRs are created, they are analyzed to determine whether fraudulent calls are occurring. The CIRs are transmitted to a pre-processor which classifies the CIRs 40, as described above. The pre-processor classification eliminates unneeded portions of the data that is collected. After the CIRs have been classified, they are transmitted to the watch point processor (FIG. 1). The watch point processor stores the CIRs in a random access memory 50. The stored CIRs are compared to predetermined operator defined thresholds 60 by the watch point processor. If any of the CIRs are not within the thresholds, an alert is generated 70 by the watch point processor. The alerts can be in the form of audible, visual or remote, as described in detail above.

The alerts are transmitted to the fraud analysis processor (FIG. 1) where they are stored 80 in a random access memory. The storage of the alerts enables a operator to analyze the alerts and take the appropriate action to terminate the fraudulent call or transmission. The alerts and CIRs are also archived 90 by the fraud analysis processor (FIG. 1). This archival of data facilitates the analyzation of data to determine trends of fraud. All of the steps described above can be accomplished in real time during the duration of the call.

It is to be understood that the steps of pre-processing, watch point processing and fraud analysis processing could be accomplished by utilizing a single processor equipped with the necessary peripherals. Accordingly, all of the storage and archival steps could be accomplished by utilizing a single database.

The current embodiment of the present invention provides an improved method and system for detecting fraudulent use of a telecommunications network. The embodiment enables the detection of fraud by effectively analyzing the signaling communication protocol transmissions that are associated with each existing call. The embodiment enables the operator to analyze a customized set of call detail records by selecting which call parameters will be incorporated into the call detail records. By collecting data directly from a STP, the embodiment allows for the detection of fraud in a manner which places no additional load on the switching equipment which handles the voice and data transmissions within a network.

It is also to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

The invention claimed is:

1. A method for detecting a fraudulent telephone call in a telecommunications system, the method comprising:
    (a) collecting signaling protocol data for a telephone call using a signal protocol receiver that is independent from a switch of the telecommunications system;
    (b) decoding the signaling protocol data to determine if the call is fraudulent during the duration of the call;
    (c) correlating the signaling protocol data into a call information record during the duration of the telephone call; and
    (d) determining that the telephone call is fraudulent during the duration of the call by analyzing the call information record.

2. The method of claim 1, further comprising canceling the call in response to (d).

3. The method of claim 1, further comprising generating an alert in response to (d).

4. The method of claim 3, wherein generating the alert comprises generating an audio, visual, or remote notification.

5. The method of claim 3, further comprising: storing the alert in a database; and maintaining the alert in the database for a predetermined period of time.

6. The method of claim 1, further comprising: storing the call information record in a database; and maintaining the call information record in the database for a predetermined period of time.

7. The method of claim 1, wherein correlating the signaling protocol data into a call information record comprises:
    forming the call information record with at least one of the following parameters:
        originating telephone number, terminating telephone number, billing type, using
        duration, aggregate duration, and call volume.

8. The method of claim 1 wherein (d) comprises comparing the call information record to a pre-established threshold.

9. The method of claim 1 wherein (d) comprises comparing the call information record to another call information record.

10. The method of claim 1 wherein (a) further comprises collecting in-band signaling protocol data from the switch.

11. The method of claim 1 wherein (a) further comprises collecting out-of-band signaling protocol data from at least one signal transfer point within the telecommunications network.

12. A method for detecting a fraudulent communication within a telecommunications network, the method comprising:
    (a) collecting signaling protocol data using a signal protocol receiver that is independent from any switch of the telecommunications network, wherein the signaling protocol data relates to a communication that is occurring over the telecommunications network;
    (b) decoding the signaling protocol data;
    (c) during the duration of the communication, processing the signaling protocol data to form a call information record; and
    (d) determining that the communication is fraudulently occurring over the telecommunications network by analyzing the call information record during the duration of the communication.

13. The method of claim 12 further comprising:
    canceling the call in response to (d); and/or
    generating an alert in response to (d).

14. The method of claim 13 wherein generating an alert comprises generating an audio, visual, or remote notification.

15. The method of claim 12 further comprising:
    storing data defining the alert in a database and maintaining the data defining the alert in the database for a predetermined period of time; and
    storing data about the call information record in a database and maintaining the data about the call information record in the database for a predetermined period of time.

16. The method of claim 12 wherein the call information record contains at least one of the following parameters: originating telephone number, terminating telephone number, billing type, using duration, aggregate duration, and call volume.

17. The method of claim 12 wherein (a) further comprises collecting in-band signaling protocol data from the switch.

18. The method of claim 12 wherein (a) further comprising collecting out-of-band signaling protocol data from at least one signal transfer point within the telecommunications network.

19. A method for detecting a fraudulent communication within a telecommunications network, the method comprising:

(a) at a signal protocol receiver, collecting signaling protocol data that relates to a communication that is occurring over the telecommunications network using the signal protocol receiver;
(b) decoding the signaling protocol data;
(c) arranging the signaling protocol data into a call information record during the duration of the communication;
(d) comparing the call information record to a pre-established threshold during the duration of the communication;
(e) generating an alert if the call information record exceeds the threshold; and
(f) storing the alert in a database.

* * * * *